(12) United States Patent
Zhang et al.

(10) Patent No.: US 7,467,293 B2
(45) Date of Patent: Dec. 16, 2008

(54) METHOD AND COMPUTING SYSTEM FOR TRANSPARENCE COMPUTING ON THE COMPUTER NETWORK

(75) Inventors: Yaoxue Zhang, Haidian District (CN); Guangbin Xu, Haidian District (CN); Li Wei, Haidian District (CN); Huajie Yang, Haidian District (CN); Yuezhi Zhou, Haidian District (CN); Guanfei Guo, Haidian District (CN); Wenyuan Kuang, Haidian District (CN)

(73) Assignee: Tsinghua University, Beijing (CN)

( * ) Notice: Subject to any disclaimer, the term of this patent is extended or adjusted under 35 U.S.C. 154(b) by 472 days.

(21) Appl. No.: 11/184,466

(22) Filed: Jul. 19, 2005

(65) Prior Publication Data

US 2006/0117172 A1 Jun. 1, 2006

(30) Foreign Application Priority Data

Nov. 12, 2004 (CN) .......................... 2004 1 0009789
Jan. 7, 2005 (CN) .......................... 2005 1 0011123
Apr. 6, 2005 (CN) .......................... 2005 1 0063064

(51) Int. Cl.
*G06F 9/00* (2006.01)
*G06F 15/177* (2006.01)

(52) U.S. Cl. ................................ 713/1; 713/2; 713/100

(58) Field of Classification Search .................. 713/1
See application file for complete search history.

(56) References Cited

U.S. PATENT DOCUMENTS 6,944,785 B2 * 9/2005 Gadir et al. ..................... 714/4
7,171,476 B2 * 1/2007 Maeda et al. ................ 709/227
7,318,148 B2 * 1/2008 Scheibli ......................... 713/1

* cited by examiner

*Primary Examiner*—Tse Chen
*Assistant Examiner*—Stefan Stoynov
(74) *Attorney, Agent, or Firm*—Seyfarth Shaw LLP

(57) ABSTRACT

A computing system based on Transparence Computing consists of clients and a server. There is no disk and no preinstalled OS on the client; a remote booting chip is set on the client's mainboard for downloading and loading the OS. Boot-supporting services, OS kernel mirrors, and applications are preset on the server; After being powered, the client broadcasts the boot request to the network and the server allocates network parameters for it. The client downloads an OS-selecting script from the server. After the user selects the needed OS, the client downloads and loads the selected OS from the server. Hence, the client fulfills the user's computing requirements just as a normal PC. The computing work is implemented on the client-side, during which the client can acquire corresponding resources such as applications, data, and documents from the server on demand. The client can be provided with private storage across the network by presetting a service in the mirror for creating virtual disks on the server, and thus data generated during or after the computing can be persistently stored on the server's storage.

4 Claims, 8 Drawing Sheets

METHOD AND COMPUTING SYSTEM FOR TRANSPARENCE COMPUTING ON THE COMPUTER NETWORK

FIELD OF THE INVENTION

The invention relates generally to a computing device based on the Transparence Computing paradigm, a client-booting method and a self-organizing method of server clusters thereof.

BACKGROUND OF THE INVENTION

The last half century has seen the evolution of the computing technology from the mainframe-based host computing stage to the desktop-based network computing stage. Recently, the trend is heading for the pervasive computing which involves various mobile apparatus such as cellular phones, notebooks, PDA, in-vehicle devices, etc.

However, as far as the pervasive computing and other previous computing paradigms, for example, the network computing are concerned, certain OS, corresponding supporting toolkits and applications must be developed and installed before usage. Otherwise, the machine cannot carry on corresponding application computing or run corresponding software systems. This results in current situation in which the requirement of all PC computer indexes (the size of memory and hard-disk, the frequency of CPU, etc.) are higher and higher, and software and OSs are becoming more and more complex and enormous. As for those mobile devices (PDA, cellular phone, etc.) and digital appliances (such as ISDN telephone, etc.) which can only be installed with a small embedded OS because of its limited capability, although they can run some small software, they have difficulties to inter-connect and inter-communicate to the universal computer network system such as the Internet. Moreover, the continuous upgrade of hardware and thereof the corresponding relationship between hardware and software systems makes the software systems become more and more complex, which as a result increases the cost of usage and maintenance. Besides, the abandoned obsolete computers become a new source of garbage and result in new environment pollution.

The Transparence Computing (ZHANG Y. X., "Transparence Computing: concept, architecture and examples", college journal of electron, VOL 32, NO 12A, 12, 2005) is a computing paradigm in which users are not required to perceive the physical distribution of the computer OS, supporting toolkits and applications, instead, corresponding computing services can be found and accessed within pervasive devices (including various mobile/non-mobile devices and appliances) according to users demand, while these services are persistently stored in servers on distributed networks FIG. 1 shows that the system of the Transparence Computing paradigm is constituted by clients and servers, having similar hardware architecture as the legacy client/server system. An important difference between them is: the clients in the Transparence Computing paradigm can be various different terminals (PDA, mobile terminals, appliances. etc.), nowadays so-called pervasive devices.

Another important difference of the Transparence Computing comparing to other computing paradigms like the client/server is: every computing device of all other computing paradigms must correspond to a given OS. This is not only because that the OS kernel must match with the low-level interface of hardware, but also because that it is a traditional method. However, the Transparence Computing enables the users to choose and use preferred OS and applications on a computing device. And these OS, toolkits and applications need not to be persistently stored in the device in advance, instead, they can be acquired on demand by downloading from servers storing these resource. As long as the hardware interface of the device can support these OS, users can dynamically download and install these OSs, toolkits, applications etc., according to their needs. During this process, the existing local software systems and programs will be overwritten to save a large amount of storage and computing time resource of the client devices.

Another strength of Transparence Computing is that its servers are used only for storing various resources, not the applied computing. This substantially reduces the server's burden and shortens its response time for users.

The physical driver layer of Transparence Computing provides the network connection between servers and clients. It consists of NIC, drivers and the network-connecting programs. For example, Ethernets, including the high-speed Ethernet and wireless Ethernet of 802.11, can all serve as the physical driver layer for Transparence Computing. Other examples include IEEE1394, infrared, bluetooth, and cable TV. The physical driver layer corresponds to the pervasive communication, making the Transparence Computing paradigm usable in various environments like wired, wireless and mobile environments. Since Transparence Computing uses universal communication networks to support communication, it can be easily inter-connected to the Internet, TV-Cable, and the like.

The Transparence Computing layer is the key layer of Transparence Computing. It consists of: the Multi-OS Booting Connection protocol, the Application Schedule and Management module, the User Request Management module, the User Management module, and the Server Resource Management module.

The application computing layer accepts and serves users computing requests. It enables the user to use a client (computer) as if it is a common PC. The layer can also implement the Active Services (referring to: ZHANG YAO XUE, "Active Service: Concept, Architecture and Implementation", ISBN: 7030145763), which could provide users with more intelligent, personalized and comprehensive computing services.

Based on the Transparence Computing paradigm, the present invention provides a computing system which consists of client-side and server-side devices, as well as the booting method of its client devices, and the self-organizing method of its server clusters. In particular, the invention is an NC (Network Computing) system based on the Transparence Computing paradigm.

The concept of the Network Computer was brought forward in 1995 by Ellision, who developed Oracle. Simplifying the hardware of the PC, the initial NC is a low-cost, diskless system with an embedded system in its main board ROM. Its software consists mainly of a Java virtual machine and a WWW browser. After the embedded OS has been run, it downloads and loads Java Applets stored on the servers by the WWW method. The representative NC of this kind is the Java station NC of SUN Microsystems®. It has a similar but simpler hardware configuration than the PC. As for software, it has an embedded OS in local ROM (JavaOS), and can support Java virtual machine and Internet protocols. After the local embedded OS has been run, it can access programs and data stored on application servers. This kind of NC can support very limited applications and cannot support prevalent Windows applications.

NetPC is another similar solution provided by Microsoft. Like a normal PC, NetPC has a local hard disk, but it does not store any OS. After being powered on, it downloads an OS and applications from servers to its local hard disk, and then executes all of the applications locally. However, NetPC has less flexibility and scalability than the traditional PC. It can only run the Microsoft Windows® operating systems. Moreover, it downloads and loads not only the OS, but also all applications to the local hard disk in one batch, which could easily result in a strong network traffic burst and possible network congestion. NepPC also cannot support running large software. Like the traditional PC, another disadvantage of NetPC is that its hardware has to be upgraded very frequently to meet the ever-growing needs of the user.

The Thin Client is a concept derived from the client/server paradigm. The Thin Client has simpler hardware than a PC, having no local hard disk. It has a large capacity ROM on the main board to store an embedded OS or X-Terminal protocol codes. After being powered on, the Thin Client only runs the embedded OS or the X-Terminal protocol codes on it, and accesses programs and data on servers. The most important attribute is that the computing does not need to be implemented locally because the running of application programs and the processing of data are all done by the remote servers. The client only deals with the reception and displaying of computing results. The Thin Client is a descendant of the dumb terminating technique. The WBT (the Window-Based Terminal) is a type of Thin Client. The Thin Client does not carry on any computing and data processing tasks on the client. It is only responsible for the users interface processing, so the performance requirement of the server is very high. When some applications with intense computing requirements are needed (e.g. a multimedia encoding/decoding application) the maximum load capability of the server will be greatly limited.

In short, as for the various existing computer forms, because of the limitation of their designing paradigm, users have to perceive the location of computing resources including application programs, supporting toolkits, and the OS. Therefore, problems exist such as: the client-side devices have excessive computing dependence on servers; the system has minimal support for multimedia applications; upgrading software is difficult; and manageability is poor. Therefore if the traditional NC system can adopt the paradigm of Transparence Computing, the OS and initial applications will be downloaded from server to local diskless NC client (computer) after being powered on. Thus the NC system could not only stay low-cost but also better support client requests, especially requests for multi-media applications. We termed this solution the MMNC (Manageable Multi-media Network Computer), which is a type of NC system based on the Transparence Computing paradigm. One version of the serial 'Longxin' Network Computers, which are being developed by our Network System Group of DCST, Tsinghua University, is based on one prototype of MMNC.

SUMMARY OF THE INVENTION

In view of existing computer systems' (legacy NC, Thin Client etc.) limitations, including over-dependency on servers, limited support of multimedia application, software upgrade difficulties, poor management, and poor server load capability, the present invention provides a type of Network Computer system based on Transparence Computing, termed the MMNC system.

This computing system is based on Transparence Computing. It consists of NC clients and a server connected by computer networks that support broadcasting. The mainboard of the client has components as follows: a low power-consumption CPU, host bridge, south bridge, main memory, BIOS, PCI BUS, NIC, and other peripheral adapters; there is no disk and no preinstalled OS on the client; a remote booting chip is set on the client's mainboard which stores codes of the remote booting protocol for remotely downloading and loading OS codes; services like the NFS service, the PXE service, the DHCP service, the TFTP service, the SAMBA service, and varied OS kernel mirrors, applications, documents and data are preset on the server. The system operates orderly according to the following steps to fulfill users' computing requirements: 1) power on and initiation of the local environment and networking; 2) the client detects the remote booting chip under the CPU's control, then starts the booting procedure on the network; 3) the remote booting codes stored in the remote booting chip are executed and the client broadcasts the boot request to the network; 4) after receiving the client's boot request, the server sends a response to the client, which contains allocated network parameters for it; 5) the client sends a download request to the server for the OS-selecting script; 6) the server sends its OS-selecting script to the client, which contains varied OS options for which it can provide the corresponding mirrors; 7) the client executes the received OS-selecting script, and the users make their selection; 8) the client sends the download request to the server for the mirror of the selected OS kernel; 9) the server sends the mirror of the selected OS kernel to the client; 10) the client receives and loads the mirror of the selected OS kernel; 11) hereafter, the client fulfills any user's computing requirement like a normal PC, the computing work is implemented on the client locally, and according to the application requirements the client acquires corresponding resources such as application programs, data, and documents from the server during running. Optionally, using existing techniques, within the said OS kernel mirror, a client daemon service can be preset for creating virtual disks on the server across the network, and a corresponding server daemon service is run on the server, therefore providing the client with private storage space. Additionally, within the said OS kernel mirror, a daemon service can be preset for creating virtual disks in the client's memory, and data generated during or after the computing process on the client can be temporarily stored into its memory.

The MMNC system adopts the Transparence Computing paradigm, alleviating the traditional NC system's over-dependence on servers, the limited support of multi-media application, and difficulties of software upgrading and management.

The invention also provides the cooperative booting method of the MMNC clients and the self-organizing method of the server clusters, which make the MMNC system gain better performance, higher availability, and linear-like scalability

BRIEF DESCRIPTION OF THE DRAWINGS

For a more complete understanding of the present invention and the advantages thereof, reference should be made to the following detailed description taken in connection with the accompanying drawings in which.

DETAILED DESCRIPTION OF THE INVENTION

Figure 1:
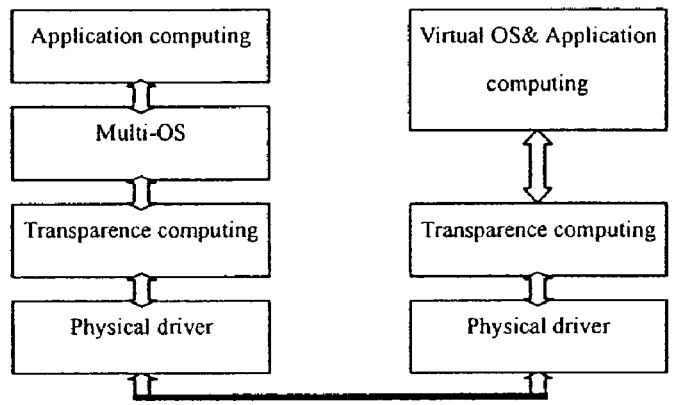
FIG. 1 is an example hierarchical structure diagram of the Transparence Computing paradigm.

Referring to the drawings, the present invention is described as follows.

Figure 2:
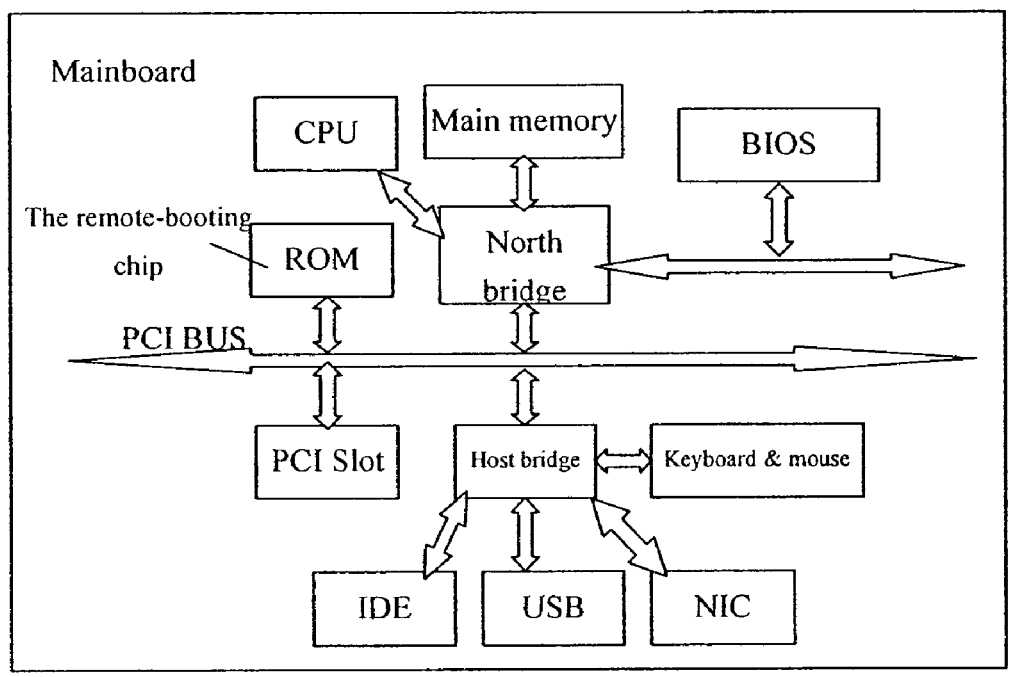
FIG. 2 is an example hardware structure diagram of the client of the MMNC system.

The invention provides a novel Network Computer system named MMNC, its computing devices and methods used. The main part of its client-side device's hardware structure is a main board with some outer interfaces illustrated in FIG. 2, mainly including a low-power consumption CPU, host bridge, south bridge, main memory, BIOS, PCI BUS, and IDE interfaces, audio controller, video controller, network interface controller, interfaces of RS232, USB, IEEE 1394, TV-OUT, FAX/MODEM etc. Another key component is a remote booting chip for loading the OS. The remote booting chip can be an independent ROM/FLASHROM on the main board, or a ROM on the NIC, storing the codes of the remote booting protocol. Alternatively, the codes of the remote booting protocol can be stored in the BIOS chip to form the extensive BIOS chip which carries out remote booting function. After remote loading the OS, the client downloads and loads requested files, programs, and data stored on the servers according to users demand, then it carries out computing locally to complete users computing requirements.

On the other side, the invention uses normal PCs or workstations as its servers.

In the first preferred embodiment of the invention, the codes of PXE (the Preboot Execution Environment) are stored in the BIOS chip on the mainboard to form the remote booting chip before the client can be used. For example, a Linux system is installed on one server as the operating system. A DHCP (Dynamic Host Configuration Protocol) server, a TFTP server and a PXE server are pre-installed and preset on the server. Besides the OS kernel (which can be Linux, Windows, etc.), mirror and root file system mirror used by the client are also pre-stored in the server, which includes the initial applications and corresponding data. After being powered on, which is controlled by the remote booting chip, the client uses the DHCP service to get its own IP address from the server, and then downloads the OS kernel mirror and root file system mirror by TFTP protocol. They are then stored into a local RamDisk created by the remote booting chip of the client in advance. After shifting the control to the OS, users can operate the client and use more complex functions like operating a traditional PC by accessing resources (programs, documents, data) from remote servers (their OS may be Linux Windows etc.) through existing network protocols such as FTP, NFS, and HTTP. The computing task is performed by the client. The detailed implementation of the single step of the said solution is within the existing art's area, so a lengthy description may not be necessary.

As for the second embodiment of the invention, an independent ROM as the remote booting chip is set in the client, storing the codes of the ETHERBOOT protocol. Similar to the above-mentioned example, a Linux system is installed on one of the servers as its operating system. A DHCP server, a TFTP server and an NFS server are pre-installed on the server. After being powered on, the client first uses a DHCP service to get its IP address from the server, then downloads and loads the OS kernel mirror, shifting the control, and loading the root file system mirror (including initial applications) through NFS protocol.

In the third embodiment of the invention, an independent ROM as the remote booting chip is set in the client, storing the codes of the RPL (Remote Program Load) protocol. A Windows 2000 server is installed on one of the servers as its OS in advance with the remote booting service of the Windows NT4 because the Windows 2000 server cannot provide support for remote booting by itself. After the client is powered on, it uses the RPL protocol to download and load the DOS or the Windows 3.2 OS mirror, and initial applications. After shifting the control, it may use METAFRAME to connect to servers for resource henceforth.

In the fourth embodiment of the invention, the codes of PXE are stored in an independent ROM as the remote booting chip on the mainboard. A Windows 2000 Server system is installed on one of the servers as its operating system. Both DHCP and PXE-PDK services are preset on the server. A sample client mirror is produced as follows: 1) temporarily connect a harddisk to the IDE interface of the client, 2) install on it the Windows 98 OS and initial application programs as done with a normal PC, 3) set and make the mirror file according to the LITENET. After that, the mirror is stored on the server. After being powered on, the client downloads and loads the mirror by the PXE. By using NET USE, the shared file of Windows 2000 server can be mapped into a network virtual disk for each client, therefore providing the data storage service for the Windows 98 system In the fifth embodiment of the invention, an independent ROM as the remote booting chip is set on the client mainboard, storing a remote booting protocol to support the loading of multi-OS. A Linux system is installed on one of the servers as its operating system. A DHCP server, NFS service, and SAMBA service are preset and installed on the server. The server also stores various Linux and Windows OS mirrors, including corresponding initial applications. The remote booting chip is slightly different in functionality from the above mentioned ones. The client downloads a script from the server after getting its own IP address. By executing the script, the client prompts users to select the desired OS from a candidate list displayed on the client's screen. According to the user's selection, the client downloads and loads the corresponding mirror. The client is provided with file services by NFS or SAMBA services, and uses demand loading techniques to implement application optimization of the client, thus it can support abundant desktop applications.

As an improvement, by using some existing virtual disk techniques (such as RamDisk, NFS, NBD etc.), client daemon programs can be preset within the downloading mirrors stored on the server, while the corresponding server daemon programs are preset on the server or some other servers, so that virtual disk space for this client are made both on the server and/or local memory. So after the client daemon program has been run by a client, it can be provided with persistent and/or temporary private disk space (different from the diskless workstation). As a result, data generated during or after the computing process on the client can be persistently stored into servers' storage and/or cached in its memory. For the sake of safety, data temporarily stored in the virtual disk in the client memory can be exported manually by the system administrator from time to time, or automatically exported to servers' storage through NFS service by setting another client daemon program in the client's mirror which functions every time the client will be shut down.

Generally, the embodiments describe a type of Network Computer system-MMNC, which is based on the Transparence Computing paradigm, as follows: 1) the system consists of clients and servers; 2) the client is diskless; 3) none of the OS are pre-installed in the client, rather, a remote booting chip is set on the mainboard of the client; 4) varied supporting services are preset on the servers; 5) resources for clients' use such as OS mirrors, applications, documents and data are also stored on the servers; 6) after being powered on, the client begins to execute booting codes stored in its non-volatile storage; 7) the client makes contact with the server by broadcasting, and then obtains its IP address allocated by the server which has received the client's broadcasting request; 8) the client then downloads an OS-selecting script; 9) after selection by the user, the client sends a download request for the mirror (OS kernel, root file system including initial applications) to the server; 10) the server transmits the mirror to the client after receiving the request; 11) the client receives and loads the mirror, which completes the booting procedure of the client. As for the client, the computing work is occurs locally. The client can download the requested applications and needed data from servers on demand; during and after the computing, the produced data can be cached in memory or be stored on servers. These differences make MMNC free from problems of the traditional NC system, namely that the client has very heavy dependence on the server when running, especially when it's processing some multimedia applications, and can support only limited variety of applications. The current invention also increases the server's maximum supporting number of clients. Moreover, users can choose to download and load a specific OS according to their preference or requirements.

What can be seen from the above is that, similar to traditional NC system during the booting period, the client of the said MMNC system depends totally on the server in that every client sends to the server the download request for booting itself, and then downloads the OS kernel and initial applications mirror. During the process, the server not only has to handle each newly received download request, but also must allocate various needed resources, such as memory, virtual memory space, I/O buffer, and, most importantly, the CPU processing time to dispose the request and implement the file transmission. In fact, the server adopts a kind of Round Robin-like scheduling policy to process received clients' requests for booting. Its practical concurrent processing capability is poor. As for a single normally-configured server, if in a very short time it receives a large amount, or namely a 'burst', of download requests for booting from clients (which is a very likely situation in the multi-media classroom application), the server will become the bottleneck of booting performance; therefore the average booting time-cost of clients will increase extremely. Clients can theoretically co-share the band width resources of the whole network, since logically clients and the server forms a star-like topology during booting period. Therefore only bandwidth resources of direct links between clients and the server will mainly be exploited, and the utilization efficiency of the network will decrease. To make matters worse, if the server receives a considerable number of additional download requests while it is already in a high-load status due to the lack of any restriction mechanism for controlling newly-arrived client download requests for booting, the server will try to allocate various above-mentioned resources for them, which will cause a heavy burden on the server's performance and easily result in its unsteadiness or sudden performance drop. This practically becomes another bottleneck of maximum supporting client numbers of the server.

Downloaded by the client together with the OS kernel in the mirror from the server, the initial application files are files which constitute the applications that users can use initially when the client system just completes the booting procedure. Besides the OS kernel, the initial applications are a necessary program resource for booting a client. In fact, the OS kernel and the initial applications can all be downloaded separately (apparently they cannot be in the same mirror file in this case). Normally, a client has several dozen initial applications, each of them consisting of multiple files. The total sum of their size normally is greater than the OS kernel's. So if we can improve the server's processing and transmission mode of the download requests for the initial application part during the booting procedure, we may improve the booting performance of clients.

Therefore, this invention presents a cooperative client-booting method in the said MMNC system. It can alleviate problems in the booting procedure such as clients having excessive dependence on the server, low utilization efficiency of network, and poor robustness of the server. Referring to the drawings, a detailed description of the method is provided as follows.

Figure 3:
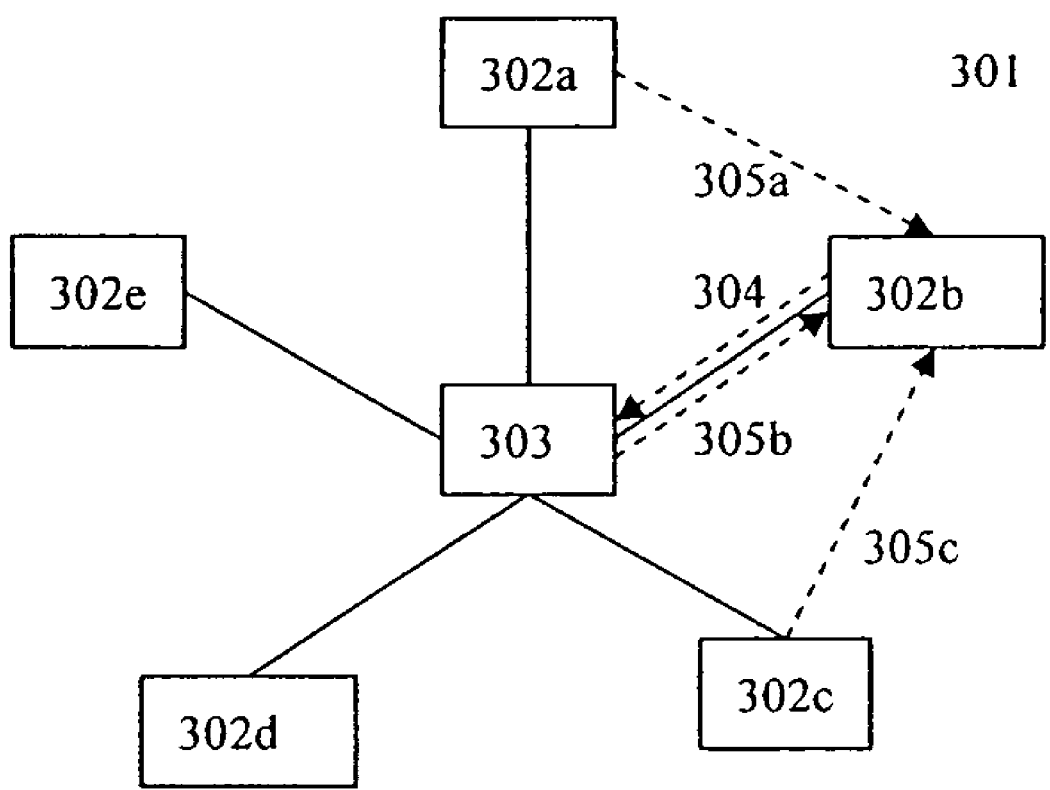
FIG. 3 is an illustrative network distribution diagram of the cooperative client-booting method of the MMNC system

FIG. 3 is an illustrative network distribution diagram of the cooperative client-booting method of the MMNC system. Multiple clients 302 and one server 303 are located on the same computer network. The hardware configurations of them are similar to the above-mentioned ones. During the client-booting procedure, the same process steps are taken as the above-mentioned embodiments until the transmission of the OS kernel has been completed. Then the client sends the download requests to the server for downloading the initial application files 304. When handling the download requests, the server doesn't initiate the file transmission immediately; instead, it will designate computers on which the client can find the requested files by their IP addresses. When the client has received the response, it can initiate a file transmission request to computers with the target IP addresses, and then accomplish the transmission 305. So the transmission of the initial application files is no longer provided only by the server; it can be provided by many computers at the same time.

Figure 4:
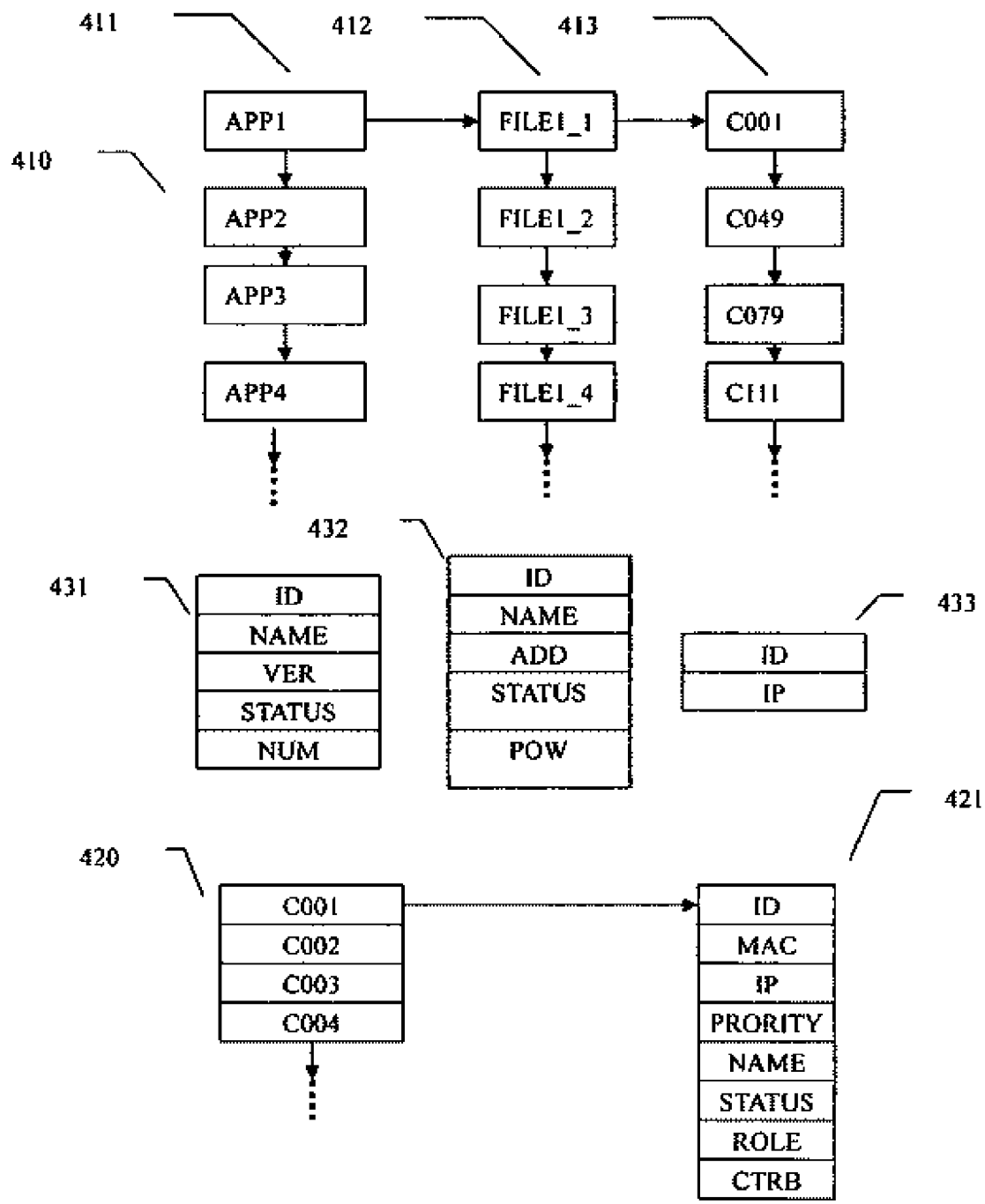
FIG. 4 is an example diagram of application file resource distribution table.
Figure 5A:
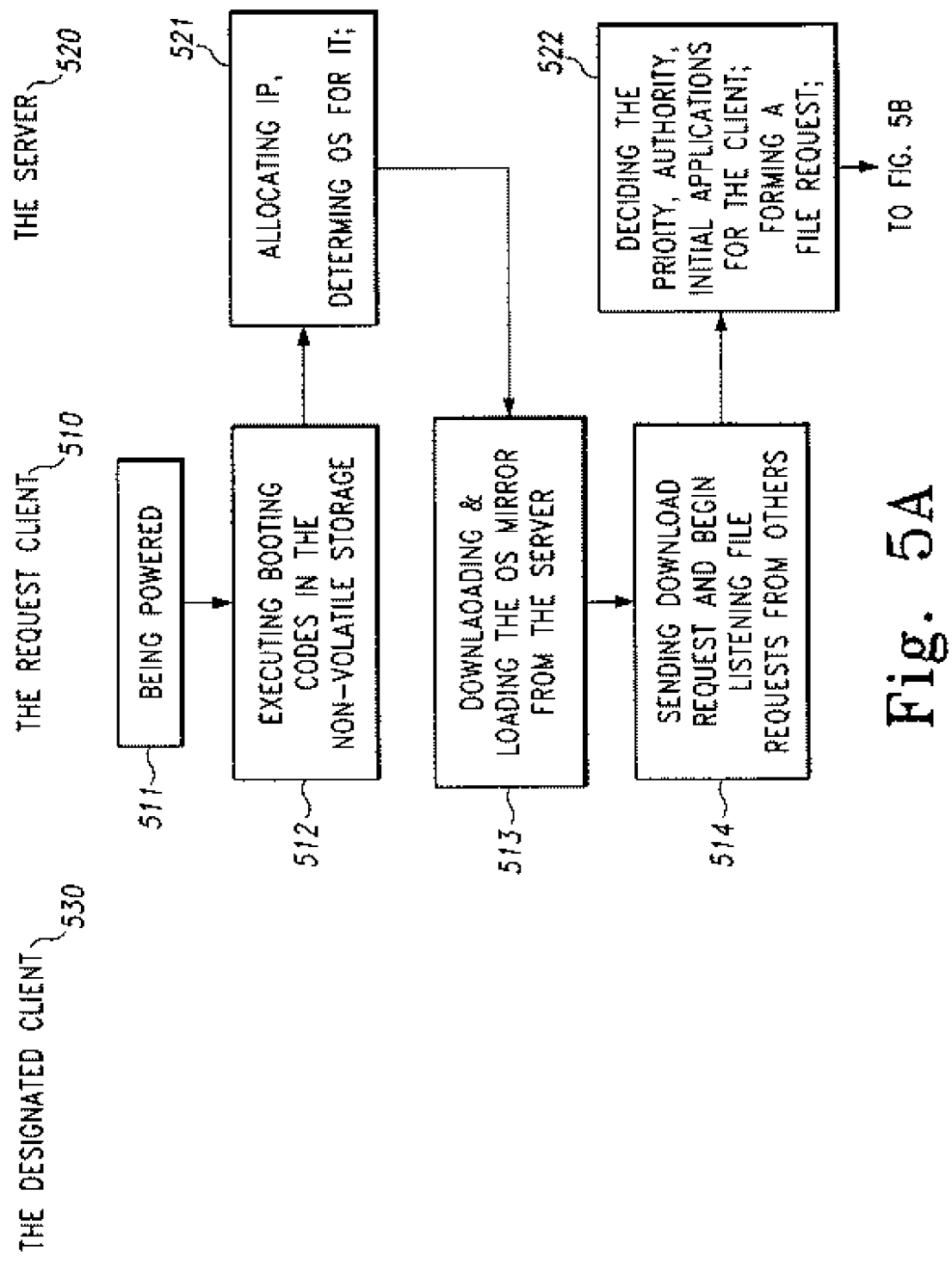
FIGS. 5A and 5B combine to show the illustrative flowchart of the cooperative client-booting method.
Figure 5B:
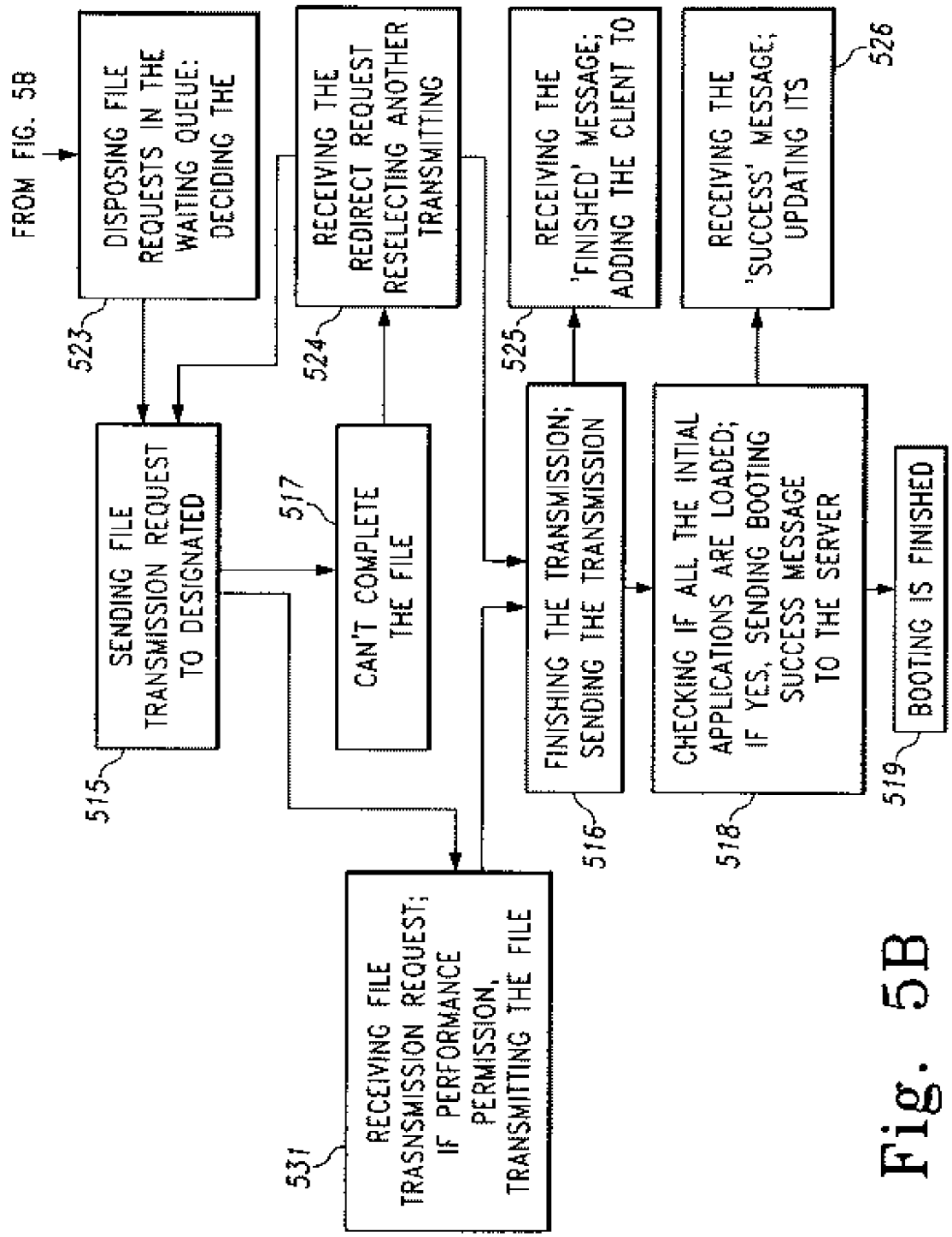

Referring to FIG. 4, the present invention has defined an application file resource distribution table 410 (AFRDT) for the server and clients. The AFRDT of the server is used for recording dynamically the distribution status of initial application files of the whole client system. The AFRDT of the client is used for recording dynamically the locally stored initial application files. By default, the server contains all initial application files. Included within the messages, the AFRDT structure is also used for the interaction of server-client/client-client regarding files distribution status, request, and response. The AFRDT is a three-dimension list, where its items correspond to an <application, document, computer> triplicate. The first dimension list 411 records information about the initial applications. Each node of the list stores the application information including ID, name, version, status, the affiliate files' number. The second dimension list 412 records information about the affiliate files of an initial application, each node representing a file. The information includes ID, name, local address, status and the weight 432. Among them, the weight value represents the transmission cost of that file, which can take a value positive to its size. The third dimension list 413 corresponds to a node in the second dimension list 412. It records clients' information which stores that file, including ID and IP address. The server also maintains a client list 420, indexed by client's ID, recording information about ID, name, physical network address, IP address, booting priority, booting status, client role and contribution value of a client. Among them, the client role can be used as a key influential factor when choosing the downloaded OS and/or initial applications, while the contribution value can be used as a key influential factor by the server to choose target transmitting computers.

The server is already running before any client can boot. In addition to the OS kernel and the initial application file resource used by clients, a table of AFRDT structure is kept on the server for use in recording the distribution of initial application files across the client system. Initially, there is no booted client, therefore there is no initial application file resource exiting on any client. Correspondingly, the third dimension of the server AFRDT is null. At this time, the AFRDT records only the initial application files information on the server itself. The initialization of the server AFRDT can be done manually or it can be automatically generated from a preset '.ini' configuration file on the server. Whenever there are some clients having downloaded some initial application files, they are inserted into the third dimension list of the server AFRDT. Optionally, different personalized parameters like roles and corresponding priorities can be defined for clients according to their MAC address or IP address etc., so the server can designate different initial applications for different clients according to these parameters.

Until the client has received the OS kernel mirror, the cooperative client-booting method of the invention adopts similar process steps as the above-said MMNC embodiment. Concretely the process flow is as follows: 1) The Client begins its booting procedure after being powered on 511, executing the codes stored in local ROM 512; 2) the client establishes contact with the server by broadcasting to the network; 3) the server assigns an IP address for the client; 4) after acquiring the IP address, the client sends a request to the server for downloading the OS kernel mirror; 5) the server transmits an appropriate OS (e.g Linux) kernel mirror to the client by TFTP 521; 6) the client receives and loads the OS 513 and begins to run a TCP service to listen for any possible file transmission requests sent by other clients through a specific port; 7) meanwhile this request client sends a download request for downloading initial applications to the server 514; 8) the server receives 522 the download request (also called the file request) and then according to the MAC address of the client, decides its role and priority; 9) based on the priority, the server decides the importance of this file request 9a) if the file request has a low priority, it may be put into a waiting queue; 10) as for a file request, the server decides the client's initial applications corresponding to its role, recording these applications and related files into a new AFRDT data structure which is added to the file request; 11) the file request is then put into a suitable queue for processing.

The server maintains two queues of file requests: one is waiting queue, another is processing queue. Similar to the above-said embodiments, the server disposes the file requests in the processing queue in a round-robin manner, having no strict mechanism, while the file requests in the waiting queue have to be delayed by the parameter δ for shifting into the processing queue. The value of δ can be set according to users' in-field need or it can be set as an experience value. Normally δ∈ [1-60] second, or 1-5 times of the measured average time for the server disposing a single file request.

To put a file request into which queue mainly depends on the server's performance condition at that time, which may be embodied by some parameters, such as the CPU utility ratio Pλ, the memory utility ratio Mλ, the virtual memory utilization ratio Gλ, the traffic to bandwidth ratio P/T, or an output value of a function that takes these factors as its input parameters. For example, supposing the performance function is $\Phi=Max(P\lambda, M\lambda, G\lambda, P/T)$, where the threshold can be set as $\gamma\in(0.8, 0.9)$. Therefore, when scheduling a newly-received file request, if $\Phi\geq\gamma$, the request is put into the waiting queue. If $\Phi<\gamma$, then the request is put into the processing queue. Optionally, if the file request is of low priority, it may be put into the waiting queue directly, bypassing the server performance based decision-making.

When disposing a file request, the server knows what files the client is requesting according to the AFRDT table included in the file request. Then, for each file in it, the server searches it in its own AFRDT, choosing out one client which is stored in that file as the target transmitting computer (namely, the designated client), and adds it to the third dimension of the file request AFRDT 523.

The server can adopt among varied policies for choosing a designated client from its own AFRDT, which could be random, first match, LRU, or some priority based ones. In addition, in view of fairness, a type of policy based on the client's contribution can be adopted as follows. Based on the contribution value in the client list maintained on the server, the server selects out the client that has the lowest contribution value as the designated client. If the server cannot find any client having the file as the designated client, it will transmit the file by itself, thereby adding itself as the transmitting computer (for simplicity, in this context, we call it 'designated client' as well) into the third dimension list of the file request AFRDT. The choosing of the designated client may also combine with some customized parameters, such as its priority. After the disposal, the server sends the disposed file request to the request client.

The request client receives the disposed file request, distilling related information from it, especially on which clients where it can find the needed files from the designated clients in the AFRDT of the file request. Thereafter, the client sends a file transmitting request 515 to the specific port of each designated client. The designated client 531 receives the file transmission request and initiates the transmission 305 if it has the file. Optionally, it can decide by itself whether to start the transmission or not according to its current performance condition. The client uses the local memory (RamDisk) to keep the downloaded files, or it can use other virtual disk techniques to provide the storage. After the transmission of a file is finished, the request client will check whether all the files belonging to a specific application are available. If it does, the application is loaded by the request client 516. Meanwhile, the request client sends a Transmission Finished message to the server to indicate from which client it has downloaded a specified file. After receiving the message, the server will add the request client to the corresponding third dimension list of the server AFRDT and update its contribution value in the contribution field of the client list 525.

If the request client cannot complete the file transmission (due to some factors such as "cannot setup the TCP connection to the designated client", or some file read/write errors occurred) the client sends a redirection request to the server 517 to indicate which client was unable accomplish a file transmission. After receiving the redirection request, the server re-selects another designated client for the request client 524. Optionally, at the same time, the server deletes the previous designated client from the third dimension list of the server AFRDT corresponding to the file, for it may not be able to provide that file any more. The request client receives from the server the re-designated client and completes the transmission of the related file over again.

If all initial applications in the local client AFRDT of a request client have already been started (meaning the client has finished its booting procedure) it will send a booting success message to the server 518. The server updates the status of the request client as 'booted' in the client list 526.

As far as the downloaded copies of the initial application files are concerned, if they are modified or deleted locally during the running of the client, they are apparently not the desired initial application file by other clients. When that happens, the client sends a File Modification message to notify the server they are not available in future. After receiving the notification message, the server deletes that client from the third dimension list of the server AFRDT corresponding to the file.

A problem can occur if, in the early running phrase of the whole system, a situation exists where there are many clients that want to boot at the same time. As an improvement, if for the $\delta$ time, the server has received more than a requests, and there are less than P clients having already been started, it then puts a portion (e.g. ½) of the requests into the waiting queue. The step may also combine with clients' priority. The parameter $\delta$ is of the same definition as above. The parameter $\sigma$ can take a half of the theoretical maximum client-loading number of the server (MLC) as its value, or it can take ⅔ of the measured maximum client-loading number of the server (PMLC) as its value, P☐(5% PMLC, 5% MLC)

When the same number of clients are booting at the same time, the MMNC system which adopts the cooperative client-booting method can have a lower server workload than the previous counterparts which did not. The average booting time of clients is also shorter because the utilization efficiency of the network is higher and the server therefore gains a better robustness.

The above-mentioned MMNC system was highly manageable and provided good multimedia support. The cooperative client-booting method further increased the network utilization efficiency, shortened average client-booting time and enhanced maximum load capability of single server. However, these two systems both relied on the single-server architecture, in which one server supported multiple NC clients simultaneously. Therefore not only the robustness of the whole system was limited by this single server, but also the scalability of the system became a bottleneck. Currently, mirroring technique could be used to improve the whole system's robustness and fault-tolerance and avoid such situation that single server brought down the whole system. Also, more powerful hardware and more efficient running algorithms could be adopted to increase the server's performance and load capability. However, the problem that the load capability of the server is limited mainly by the single-server architecture could be bypassed. In fact, it had been found that in practical applications, one PC server of a common hardware configuration can hardly support more than 100 clients. Requirements analysis of the possible MMNC system application showed that client devices of more than the above mentioned upper limit were required for both large-scale and medium-scale applications of NC system. Although clients could be statically divided and assigned to different servers, there were still problems such as how to make an appropriate static division and how to adjust the division according to changing of users' requirements, due to lack of an integrated framework. Another solution is to use a specific server with luxury hardware configurations to satisfy heavy load needs. However, it could result in a soaring system cost and a really low system price/performance ratio. Therefore, application in MMNC system an integrity and unified multi-server architecture, which enabled multiple PC servers dynamically and transparently serve a large number of clients in the form of clusters, could not only maintain its advantages of low cost, good manageability and well support for various applications, but also acquire better availability, scalability, robustness and a load capability increasing according to the number of server nodes.

Therefore, the invention also provides a self-organizing method for the MMNC server clusters, which provides the whole MMNC system better scalability and robustness. Referring to the drawings, a detailed description of the method is provided as follows.

A cluster of a MMNC system includes all the servers, clients and the relationship between them on a connected network. The server cluster is the set of all the servers in a cluster. At the very beginning of the system, all the servers are in an unavailable status, and belong to none of the clusters. Clients could not be used because of lack of available servers on the same connected network. At this moment, there is no server-server or server-client relationship.

The self-organization means the cluster relationship could be formed among servers and clients spontaneously, and can be adapted dynamically. The self-organized server clusters transparently provide clients with the same services that single-server architecture system could provide, such as services for client-booting (including IP address allocation, OS kernel mirror downloading etc.), customizing and downloading of requested applications, and shared data downloading. However, the clients could not perceive the differences between the multi-server architecture and the single-server architecture.

Figure 6:
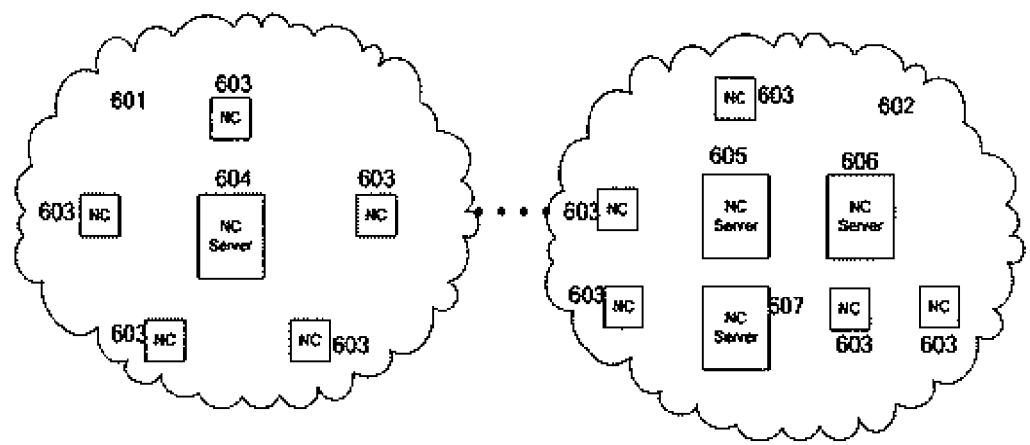
FIG. 6 is an illustrative diagram of the network topology of the pre-organizing MMNC system.

FIG. 6 is an illustrative diagram of the network topology of MMNC system which has not yet been organized. Multiple NC clients 603 and multiple NC servers 604,605,606 and 607 are physically distributed throughout the computer network 601, 602. The computer network 601 and 602 can support broadcasting respectively within themselves (such as Ethernet), but not between each other. Thus, they are considered as different connected networks. Cluster is in a connected network, a set of all NC servers, clients and their relationships. The server cluster is the set of all the NC servers in a cluster. At the very beginning of the system, all the servers are in an unavailable status and belong to none of the clusters. NC clients could not be used because of lack of available servers on the same connected network. At this moment, there is no server-server or server-client relationship.

Figure 7:
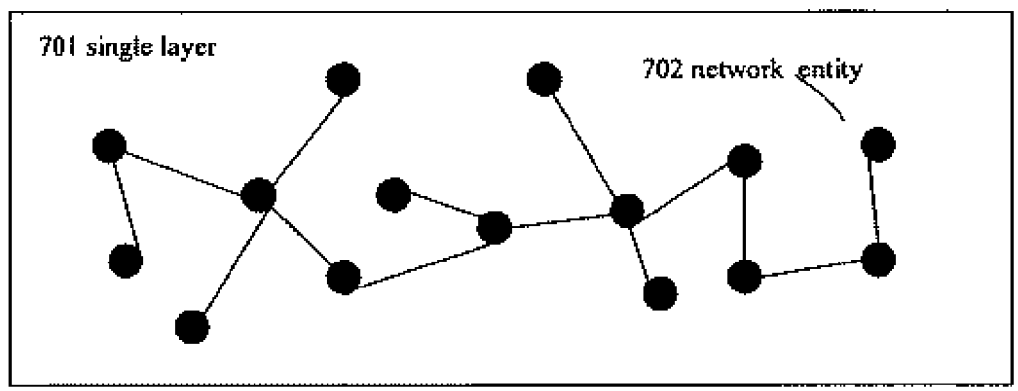
FIG. 7 and FIG. 8 are illustrative diagrams of self-organizing method of server clusters of an MMNC system
Figure 8:
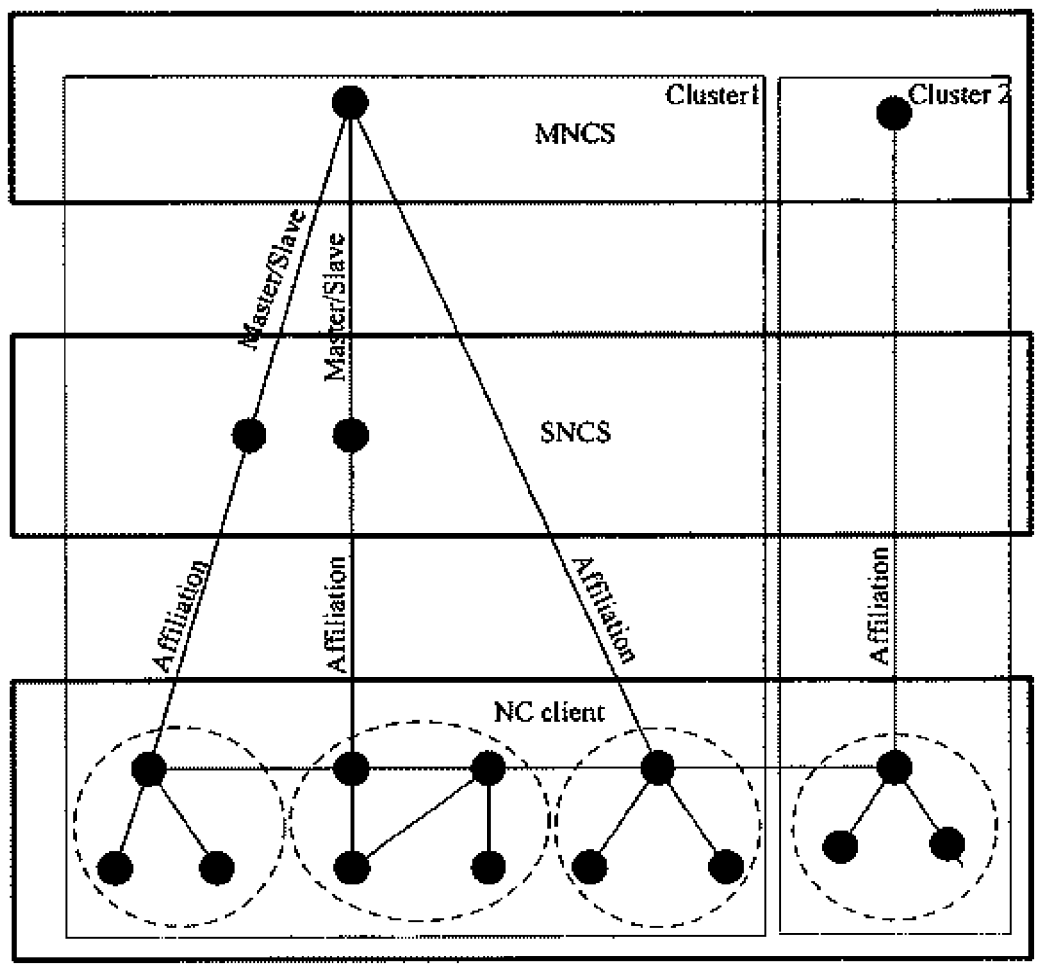

Referring to FIG. 7 and FIG. 8, the self-organizing method of the invention automatically organizes the physically-connected network entities 602 (NC servers and NC clients) of a MMNC system, which initially is irrelevant to each other semantically, into a 3-layered, multi-clustered entity relationship according to the affiliate relation between servers and clients.

Figure 9:
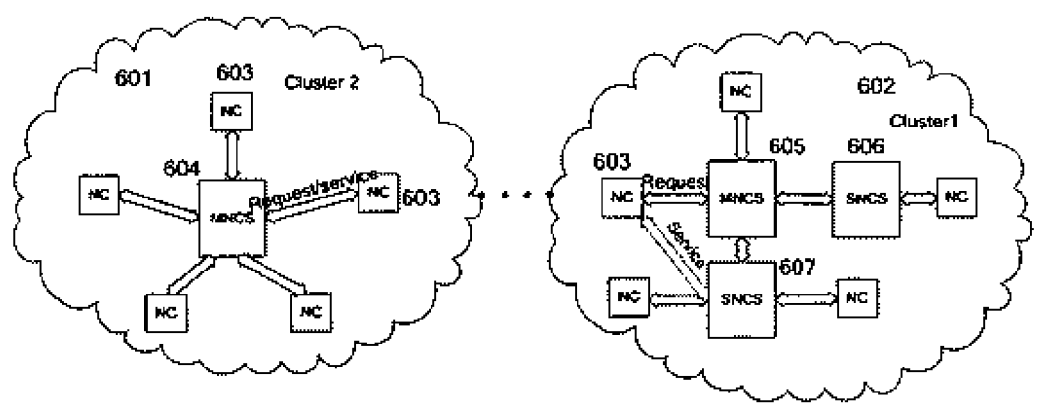
FIG. 9 is an illustrative diagram of the network topology of an MMNC system having used the self-organizing method of server clusters.

FIG. 9 is an illustrative diagram of the network topology of a MMNC system using the self-organizing method of the invention: all servers in the same connected network 601/602 are organized into a cluster (cluster 1/cluster 2); there is at least one master NC server 604/605 (MNCS) in a cluster. There are multiple slave NC servers 606 and 607 in a cluster if more than one server is in the cluster. Therefore there are multiple server clusters in different connected networks. All the clients 603 in a connected network are supported by corresponding server cluster. In a cluster, after a client has sent out a booting request, a server (a MNCS or a SNCS) will be assigned for booting and application services. This monotonic mapping relation from a client to a server is called binding.

Figure 10:
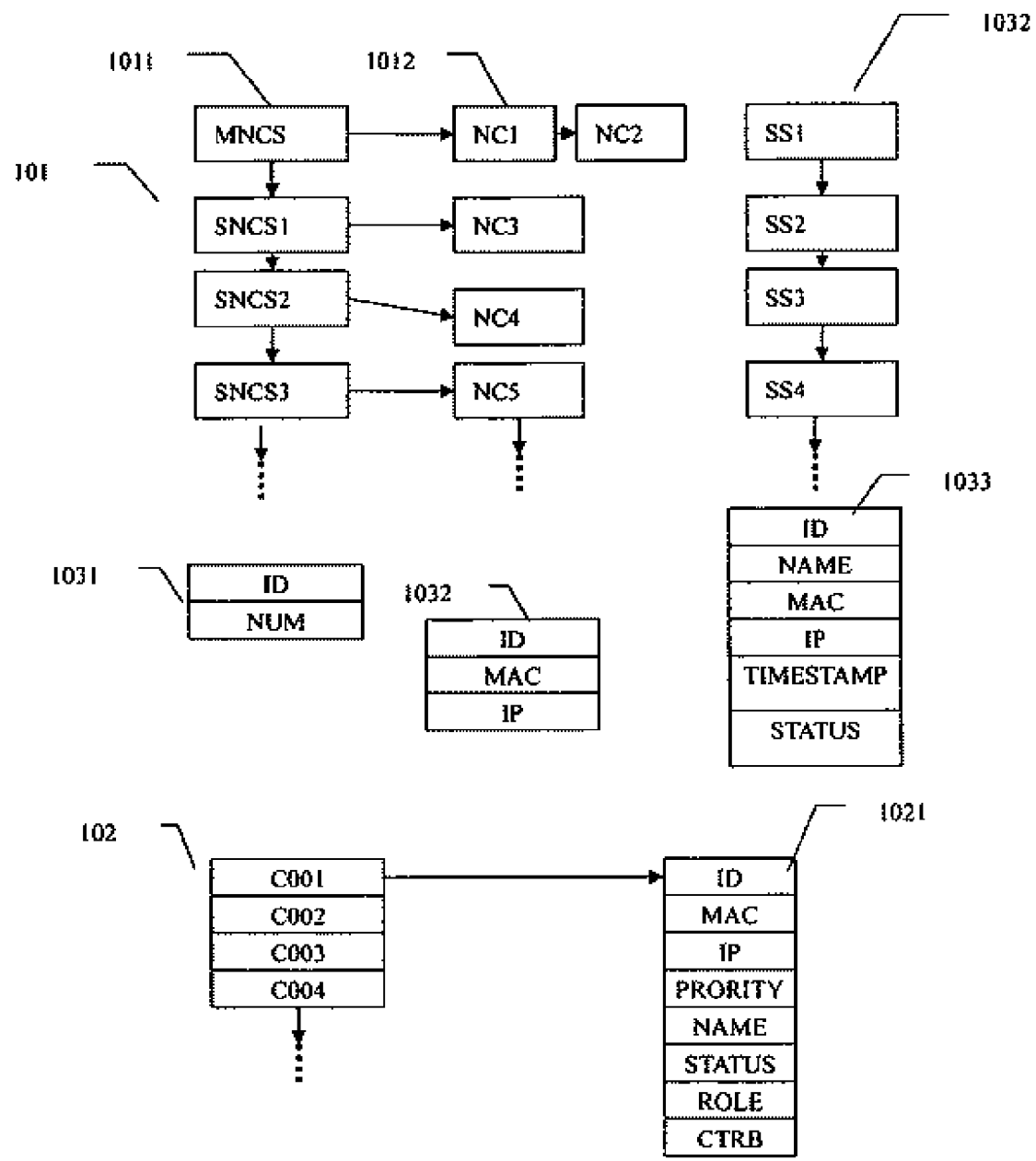
FIG. 10 is the illustrative diagram of data structures used in MNCS and SNCS.

Referring to FIG. 10, the MNCS maintained a binding table (BMRT) 1010 to record the relationship mappings of client-to-server and server-to-server, that is, the affiliate relation from clients to servers, and the master-slave relation between MNCS and SNCS. The first dimension list 1011 of the table was mainly an index: each node 1031 of MNCS and its subordinated SNCS. Each node 1032 of the second dimension list 1012 represented a client affiliating to a server. The MNCS also maintained a list of SNCS 1032 recording status information of SNCS in the cluster in which each node 1033 recorded information of a timestamp of message received from that SNCS. All servers maintained a subscriber list 1020, recording all affiliated clients' information 1021 such as ID, priority, status and the IP addresses.

The heart-beating signal of the server is an IP/UDP based packet. The heart-beating signal is an active signal. When running, the MNCS will broadcast periodic heart-beating signal at a t time intervals to the network. The heart-beating interval t can be set within 5-300 s according to the application's need, or as the multiple of the value which is calculated using the following formula: t=2*network diameter*measured average hop-to-hop delay (including the hop-to-hop transmission delay and the processing delay on a node).

The reflective signal is also an IP/UDP based packet. The reflective signal is a passive signal. The SNCS sends the reflective signal to MNCS only when receiving a heart-beating signal from the MNCS. Both the heart-beating signal and the reflective signal contain instant performance parameters of that server when the signal is sending. Such as the number of loaded clients $W\lambda$, the CPU utility ratio $P\lambda$, the memory utility ratio $M\lambda$, the virtual memory unitization ratio $G\lambda$, the I/O traffic to bandwidth ratio of the server P/T, or the function values relate to these parameters. The server loads could be timely monitored through these parameters.

The contesting signal is another IP/UDP based packet used in upgrading of SNCS to MNCS.

Servers in a connected network could be self-organized into a server cluster according to the following steps:

Step1:
The server after starting-up runs a process listening to messages sent by other servers, including the heart-beating signal, the reflective signal, the contesting signal, and the collision indication/ACK signal. The process is mainly responsible for the interaction between servers;

Step2:
If the server has not received any heart-beating signal from other servers in a time interval of 2t-5t, it will consider itself as the MNCS in the cluster, the followings will be carried out:
Empty the SNCS list. Empty the Subscriber list. Add itself as a node to the BMRT. Broadcast the heart-beating signal to the network in every interval of t. Start the process of listening to the booting and application requests from clients. Go to step4.

Step3:
Else consider itself as a SNCS, and perform orderly the followings: Initialize the Subscriber list. Start the process of listening to the booting and application requests from clients. Go to step4.

Step 4:
End

The adaptive adjustment to the server cluster is as follows:
As for the MNCS:

When receiving a reflective signal from a SNCS, the MNCS adds it into the cluster, and adds the SNCS into the BMRT and the SNCS list.

By checking the timestamp in the list of SNCS node, if the MNCS has not received any reflective signal from a SNCS for a time interval of $T_0=2t-5t$, then the heart-beating signal will be resent to SNCS in a end-to-end manner in every time interval of $Tn=T\_*1/N_n$, until its reflective signal is received. During this process, $N_0=2$, $Nn=N_{n-1}+1$, and $Nn<=Nmax$. Nmax is the user-defined maximum number of attempts. If the MNCS has not received any reflective signal from the SNCS after Nmax times of resending, then it will consider that this SNCS is unavailable in the cluster, the cluster relations will be thus updated correspondingly. Practically, all clients bounded to the server will be released, that is, SNCS and its related clients will be deleted from BMRT table and the status of the server will be set as 'N/A' in the SNCS list.

As for the SNCS:
A reflective signal will be sent to the MNCS as soon as the SNCS receives the broadcast heart-beating signal.

If the SNCS has not received any heart-beating signal the MNCS that sends out in a time interval of 2t-5t, it will consider that there is no MNCS in this connected network and goes to P1:

P1:
A contesting signal is broadcasted.
If the heart-beating signal is received from the MNCS, goes to P2.
Else If the SNCS has not received any contesting signal from other SNCS, it upgrades itself into MNCS and carries out the following: resetting the SNCS list, resetting the BMRT, adding itself into the table, adding related clients' information contained in the current Subscriber list into the BMRT, starting to broadcast heart-beating signal to the network in a time interval of t, goes to P2.
Else If the SNCS has received any contesting signal from other SNCS, it will delay for a time interval which is calculated by the Binary Exponential Backoff Algorithm as $R*T*2^N$, where R is a random number, T is the last calculated delay time (its initial delay is 2t-5t), and N is the number of calls of the algorithm. If the heart-beating signal is received during the delay, it will consider itself as a SNCS and goes to P2. Otherwise goes to P1;

P2:
End

In addition, if at any moment a MNCS receives a heart-beating signal from another MNCS (this may happen when the topology of networks is changed, resulting in that more than one MNCS appears in the same network), the cluster relation in this case should be adjusted dynamically as follows:

The MNCS which receives the heart-beating signal will send in an end-to-end manner the collision indication signal to the source MNCS of that heart-beating signal, which includes the content of its BMRT and SNCS list;

If a MNCS A receives a collision indication signal from another MNCS B, then A will compare the number of its SNCS with that of B's. If A has no less SNCS than B does, A will insert B into its own SNCS list, and non-redundantly insert the contents of B's BMRT and SNCS into its own. A collision ACK signal will then be sent to B. B is then turned into SNCS and is sent a collision indication signal. However, if A has less SNCS than B does, A will send a collision indication signal to B, consider itself as a SNCS, stop broadcasting the heart-beating signal to the network and initialize the BMRT and the SNCS list.

Clients can use the services provided transparently by server clusters. As for the server cluster, the processing of the clients requests for services is a little different from that of the single-server system. The server cluster provides the booting service to a client after the client being powered on as follows:

The client broadcasts a DHCP message to the network;

After receiving the message, the SNCS will do nothing if the client could not be found in its Subscriber list. If the client does exist in the list, services (IP allocation, OS kernel downloading, file transmission, etc.) will be provided by the server.

After MNCS receiving the message, if the client could not be found in its BMRT list, MNCS will bind the client to a server and add it to the related lists of that server (can be one of the SNCS or the MNCS) according to different policies (e.g. Finding a server that has the least load based on servers' performance parameters or Round-Robin.). If the target server for binding is a SNCS, the MNCS will notify it about the binding event. The target server (namely, the binding server) will then add the client to its Subscriber list, and provide the client with services.

After loading the downloaded OS kernel mirror and initial application, the client will broadcast to the network again. Its binding server will return a response so that the client could learn to which server it has been bound. Thus the booting process of the client is accomplished.

Henceforth, the client could send requests to its binding server for services such as customization on demand, or application downloading.

As for another embodiment, the client does not need to know its binding server at all. The client could broadcast the related requests to the network when needed. After receiving the request, the server will make a judgment of whether the client is an affiliated one or not: if YES, service will be provided; if NOT, the request will be ignored.

If for some reason the topology of the network has changed, or the binding server of a client is down, which will prevent the client getting requested services from the server, then the client will be rebooted manually or automatically after the 'N/A' situation of the server is detected. Since the cluster relations will be automatically updated after the same 'N/A' situation of the SNCS being detected by the MNCS, the client will then be bound to another SNCS after being rebooted.

As still another embodiment, servers could manually or automatically carry out the process of joining the server cluster during running. It is not necessary to do so during booting, which is more beneficial for customizing the server and dynamically expanding the total load capability of the cluster.

The MMNC system is only an embodiment of computing devices based on the Transparence Computing. Besides NC system, the method of the invention could also be applied to other computing devices. For example, the client-side devices could be mobile terminals, cell phones, PDA, and household appliance. With the devices based on this computing paradigm, the user can interactively download and load the requested OS and applications on need after powering on the client-side computing devices. It not only solves the problems that only a high performance computing device can run enormous software, but also provides users with a safer and more inexpensive system when users can choose the OS and applications for usage without installing and managing the software.

The above mentioned embodiments are application examples of this invention. All modification and improvements based on the basic theory of this invention will be considered as part of this invention.

What we claim is:

1. A self-organizing method for server clusters in a system based on transparence computing, the system comprising clients and servers distributed randomly on computer networks, wherein the clients are network computers, PDAs, home appliances or mobile terminals, wherein said client has no preinstalled OS, said server stores all the OS kernel mirrors and initial applications for booting the client, all the servers on the same broadcast-reachable network belong to one server cluster, a server cluster consists of one master network computer server (MNCS) and some slave network computer servers (SNCSs), a client can only be served by a server in the server cluster, and servers of the system self-organize themselves into server clusters according to the following steps:

Step I starting a process that is responsible for listening to messages from other servers Step II if the server has not received any heart-beating signal for a time interval of Td, it affirms itself as the MNCS in the cluster, starting to broadcast the heart-beating signal to the network periodically and listening to service requests from clients, wherein Td is a timed value of the heart-beating period;

otherwise it affirms itself as a SNCS, and starts to listen to service requests from clients;

the SNCS sends a reflective signal to the MNCS when receiving a heart-beating signal;

Step III when receiving the first reflective signal from a SNCS, the MNCS adds it to the cluster;

the MNCS dynamically maintains the status information of the server cluster according to status information in the SNCS' reflective signal;

wherein:

if the MNCS has not received any reflective signal from a SNCS for a time interval of Td, it will try to contact the SNCS, and if the MNCS fails to contact the SNCS after a certain number of attempts, the MNCS removes the SNCS from the cluster;

if the SNCS has not received any heart-beating signal for a time interval of Td, the SNCS will perform the following steps;

Step 1 broadcasting a contesting signal;

Step 2 if any heart-beating signal broadcasted by the MNCS is received in a time period of Td, the processing is then ended;

Step 3 otherwise, if no contesting signal from other SNCS is received during the same period, the SNCS then upgrades itself as the MNCS, initiates the cluster status information with its own binding client status information, starts to broadcast heart-beating signal to the network, and ends the processing;

Step 4 if any contesting signal was received from other SNCS during the same period, the SNCS then makes a delay, and if any heart-beating signal is received during the delay, the SNCS confirms itself as a SNCS, and ends the processing, otherwise going to step 1.

2. The self-organizing method according to claim 1 wherein if the MNCS receives a heart-beating signal from another MNCS, it sends a collision indication signal to that MNCS, which contains status information about the server cluster;

if a MNCS A receives a collision indication signal from another MNCS B, then A compares the number of servers in its cluster with that of B's; and if the A's server cluster has servers no less than B does, A adds information of B's server cluster into its own, adding B as a SNCS and sending a collision ACK signal to B; if any MINCS receives a collision ACK, it then affirms itself as an SNCS, updating related status information and stopping broadcasting the heart-beating signal.

3. The self-organizing method according to claim 2 wherein said client obtains services provided by the server cluster according to the following steps:

Step a broadcasting the booting request to the network after being powered on;

Step b when a SNCS receives the booting request and finds that the client is one of its affiliated clients, the service is then provided to the client;

when the MNCS receives the booting request and finds that the client belongs to none of the servers in the server cluster according to maintained cluster status information, it will bind the client to a server as its affiliated client and notify that server, and the server then provides the client with the service;

Step c after loading the downloaded OS kernel mirror and initial application, the client broadcasts to the network again, its binding server will return a response, and then the booting procedure of the client is accomplished;

Step d after being booted, the client sends corresponding requests to its binding server for the service if it needs services, such as customization on demand, or application downloading;

if a client cannot get requested services from the server, it can be rebooted manually or automatically upon detecting that the client cannot get requested services from the server.

4. The self-organizing method according to claim 1 wherein said client obtains services provided by the server cluster according to the following steps:

Step a broadcasting the booting request to the network after being powered;

Step b when a SNCS receives the booting request and finds that the client is one of its affiliated clients, the service is then provided to the client;

when the MNCS receives the booting request and finds that the client belongs to none of the servers in the server cluster according to maintained cluster status information, it will bind the client to a server as its affiliated client and notify that server, and the server then provides the client with the service;

Step c after loading the downloaded OS kernel mirror and initial application, the client broadcasts to the network again, its binding server will return a response, and then the booting procedure of the client is accomplished;

Step d after being booted, the client sends corresponding requests to its binding server for the service if it needs services, such as customization on demand, or application downloading; if a client cannot get requested services from the server, it can be rebooted manually or automatically upon detecting that the client cannot get requested services from the server.

* * * * *

UNITED STATES PATENT AND TRADEMARK OFFICE
CERTIFICATE OF CORRECTION

PATENT NO. : 7,467,293 B2
APPLICATION NO. : 11/184466
DATED : December 16, 2008
INVENTOR(S) : Zhang et al.

It is certified that error appears in the above-identified patent and that said Letters Patent is hereby corrected as shown below:

<u>Column 17</u> line 4 "MINCS" should be "MNCS".

<u>Column 18</u> line 9 "powered;" should be "powered on;"

Signed and Sealed this

Seventh Day of April, 2009

JOHN DOLL
*Acting Director of the United States Patent and Trademark Office*